United States Patent
French et al.

(10) Patent No.: US 9,623,594 B2
(45) Date of Patent: Apr. 18, 2017

(54) AIR DUCT CUFF AND METHOD OF MANUFACTURE

(71) Applicant: STEERE ENTERPRISES, INC., Tallmadge, OH (US)

(72) Inventors: Douglas French, Stow, OH (US); Eric D. Anderson, Uniontown, OH (US)

(73) Assignee: STEERE ENTERPRISES, INC., Tallmadge, OH (US)

( * ) Notice: Subject to any disclaimer, the term of this patent is extended or adjusted under 35 U.S.C. 154(b) by 46 days.

(21) Appl. No.: 14/173,884

(22) Filed: Feb. 6, 2014

(65) Prior Publication Data

US 2015/0219261 A1  Aug. 6, 2015

(51) Int. Cl.
| | |
|---|---|
| *B29C 45/16* | (2006.01) |
| *B29D 23/00* | (2006.01) |
| *B29C 45/14* | (2006.01) |
| *F16L 21/03* | (2006.01) |
| *F16L 21/08* | (2006.01) |

(52) U.S. Cl.
CPC ...... *B29C 45/1676* (2013.01); *B29C 45/1671* (2013.01); *B29D 23/003* (2013.01); *B29C 45/14598* (2013.01); *F16L 21/03* (2013.01); *F16L 21/08* (2013.01)

(58) Field of Classification Search
CPC ... F16L 3/08; F16L 9/12; F16L 47/005; F16L 47/06; F16L 47/12; F16L 21/08; F16L 21/03; B29C 45/13598; B29C 45/1676; B29C 45/1671; B29D 23/003
USPC ........ 138/109; 285/305, 322, 399, 374, 235, 285/285.1, 294.1
See application file for complete search history.

(56) References Cited

U.S. PATENT DOCUMENTS

| | | | | |
|---|---|---|---|---|
| 3,857,588 | A | * | 12/1974 | Curtin ................... F16L 13/103 138/97 |
| 5,529,743 | A | | 6/1996 | Powell .......................... 264/513 |
| 5,682,924 | A | | 11/1997 | Powell .......................... 138/109 |
| 6,041,824 | A | | 3/2000 | Powell .......................... 138/109 |
| 6,135,158 | A | * | 10/2000 | Kraus ........................... 138/109 |
| 8,448,995 | B2 | * | 5/2013 | Ward ............................ 285/419 |
| 2009/0230675 | A1 | * | 9/2009 | Densmore ..................... 285/236 |

(Continued)

OTHER PUBLICATIONS

Rubber Material Selection Guide EPDM or Ethylene Propylene, Robinson Rubber Products Company Inc., Aug. 27, 2005, https://web.archive.org/web/20050827002932/http://www.robinsonrubber.com/pdfs/EPRubber.pdf.*

*Primary Examiner* — Gregory Binda
*Assistant Examiner* — Zachary Dragicevich
(74) *Attorney, Agent, or Firm* — Renner Kenner Greive Bobak Taylor & Weber

(57) ABSTRACT

An air duct for transferring air or the like includes a tubular body, an internal cuff that is secured to and extends axially from the tubular body, and an external cuff that is secured to and extends radially from at least the internal cuff. A method for manufacturing an air duct includes providing a tubular body having at least one open end which is inserted into an internal cuff mold to form an internal cuff that is secured to and axially extends from the tubular body. The tubular body and the internal cuff are removed from the internal cuff mold and then inserted into an external cuff mold to form an external cuff that is secured to and radially extends from at least the internal cuff. The tubular body with the internal cuff and the external cuff is then removed from the external cuff mold.

9 Claims, 7 Drawing Sheets

(56) References Cited

U.S. PATENT DOCUMENTS

| | | | | |
|---|---|---|---|---|
| 2010/0301596 A1* | 12/2010 | Amann | ............... | F16L 37/0985 |
| | | | | 285/31 |
| 2014/0110010 A1* | 4/2014 | Ulle | ............................. | 138/109 |
| 2014/0338773 A1* | 11/2014 | French | ................. | F16L 37/098 |
| | | | | 138/109 |

\* cited by examiner

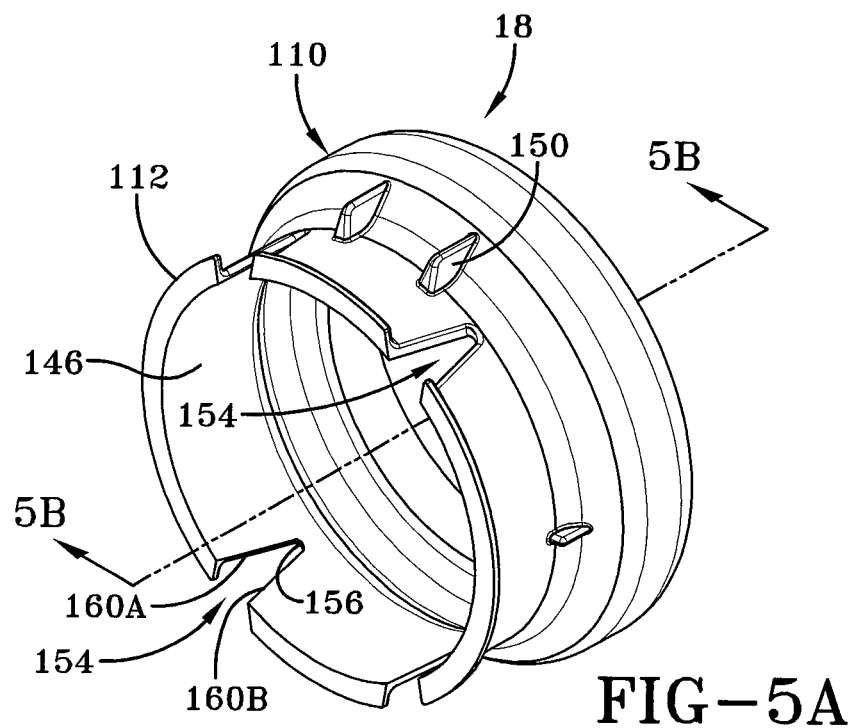
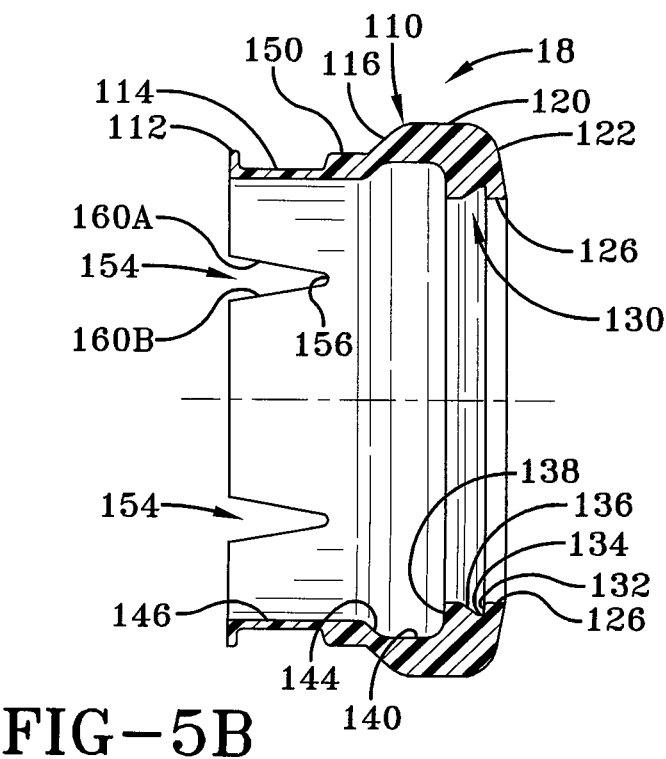
FIG-5A
FIG-5B

AIR DUCT CUFF AND METHOD OF MANUFACTURE

TECHNICAL FIELD

The present invention relates in general to an automotive clean air duct used to interconnect an automobile engine throttle body to an air filter. More particularly, the present invention relates to a clean air duct with a cuff that is positioned on a receiving port, wherein the cuff has rigid and soft components. Specifically, the cuff is formed from a relatively rigid duct, which has an overmolded, relatively soft inner cuff extending from the duct, and wherein the rigid duct and soft inner cuff are both overmolded with a relatively rigid outer cuff. Related methods of manufacture are also disclosed.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile. Air ducts are widely used in other applications wherever air or any other gas-like substance is transferred between components.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles which have limited space in the engine compartment.

An alternative to using a one-piece rubber molded air duct is a two-piece construction which utilizes a thermoplastic blow molded tubular body with an injection molded rubber cuff, sometimes called a seal, affixed to an end thereof. Although lighter and more compact than a rubber air duct, the two-piece construction has its own inherent problems. The tubular body must be mechanically secured or adhesively bonded to the seal to effect a connection therebetween that can withstand the vibration and heat within an engine compartment. Furthermore, the connection between the tubular body and the molded seal tends to break after the air duct has been repeatedly detached and re-attached to the air filter or other receiving port. And the connection is further stressed by the pressurized air flowing through the duct. A complete break in the connection between the tubular body and the seal renders the air duct unusable. Even a slight break between the two parts may allow unwanted impediments to enter the air intake system of the engine. Moreover, the additional manufacturing steps of independently molding the rubber seal and securing the seal to the tubular body adds additional cost to the air duct.

Automotive air ducts are typically made of either hard or flexible polymers depending upon the particular end application. Seals or cuffs are typically made of a very soft elastomeric polymer material. The cuffs are attached to a connection port in many ways including, but not limited to, thermoplastic welding, worm-gear clamping, or overmolding. Overmolding is the most robust process for forming the cuff because it creates a uniform melt bond to the hard polymer duct. However, such configurations are problematic in that when the cuff formed between the hard polymer duct and the softer cuff is under a shear-type load, due to engine motion, or high internal air pressures, the cuff and related seal has a tendency to tear because of their soft nature. One solution to this tearing problem is to utilize a very expensive, reinforced thermoset rubber hose.

However, the reinforced rubber hoses have a tendency to leak at flex points, thus ultimately leading to a failure of the duct and cuff. Therefore, there is a need in the art for an air duct configuration that resists tearing, provides a permanent leak-free cuff, which does not flex and which can be made at a lower cost than a reinforced rubber hose.

DISCLOSURE OF THE INVENTION

It is therefore an object of the present invention to provide an air duct cuff and method of manufacture.

It is another object of the present invention to provide an air duct for transferring air or the like from one component to another, the duct comprising a tubular body, an internal cuff secured to and extending axially from the tubular body, and an external cuff secured to and extending radially from at least the internal cuff.

It is yet another object of the present invention to provide a method for manufacturing an air duct, comprising providing a tubular body having at least one open end, inserting the tubular body and the at least one open end into an internal cuff mold and forming an internal cuff that is secured to and axially extends from the tubular body, removing the tubular body and the internal cuff from the internal cuff mold, inserting the tubular body and the internal cuff into an external cuff mold and forming an external cuff that is secured to and radially extending from at least the internal cuff, and removing the tubular body with the internal cuff and the external cuff from the external cuff mold.

BRIEF DESCRIPTION OF THE DRAWINGS

These and other features and advantages of the present invention will become better understood with regard to the following description, appended claims, and accompanying drawings. Further, in the accompanying drawings and description that follow, like parts are indicated throughout the drawings and written description with the same reference numerals, respectively. The figures may or may not be drawn to scale and proportions of certain parts may be exaggerated for convenience of illustration.

FIG. 5A is a perspective view of an external cuff utilized with the air duct cuff assembly in accordance with the concepts of the present invention;

FIG. 5B is a cross-sectional view of the external cuff taken along lines 5B-5B of FIG. 5A in accordance with the concepts of the present invention;

BEST MODE FOR CARRYING OUT THE INVENTION

Figure 1:
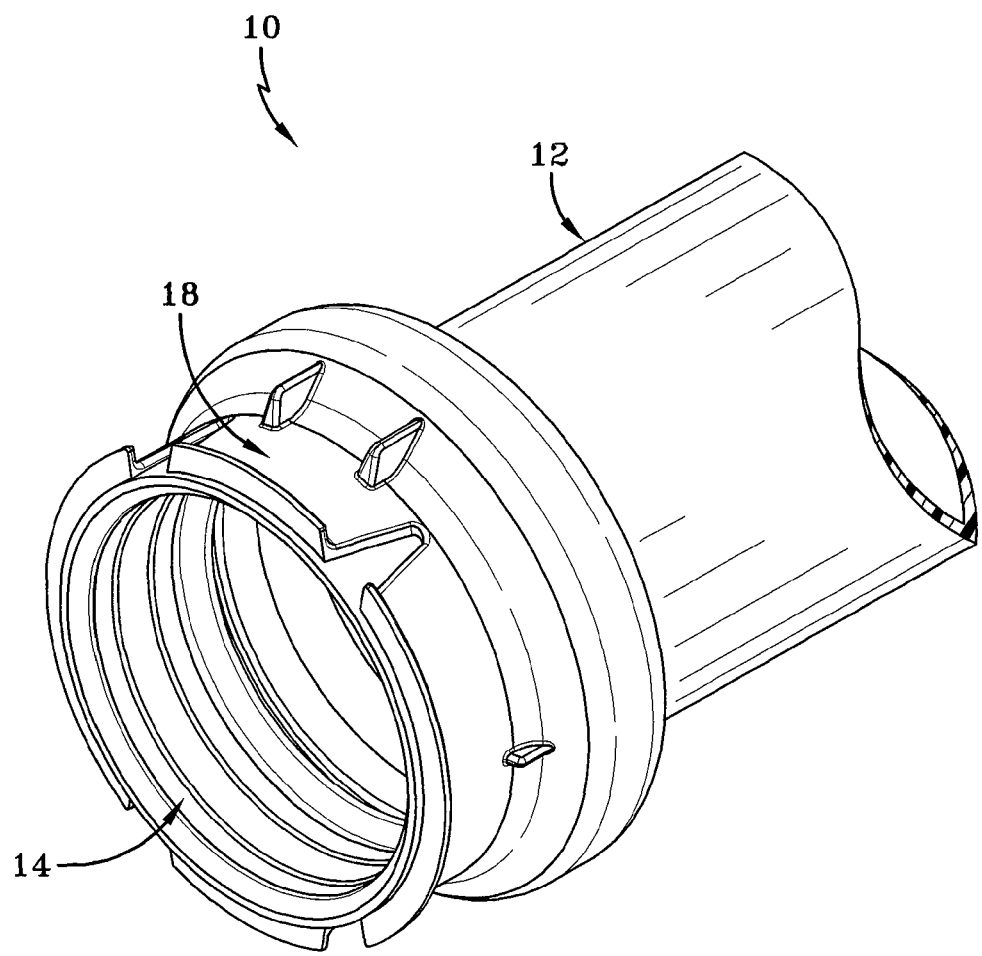
FIG. 1 is a perspective view of an air duct cuff assembly made in accordance with the concepts of the present invention.

With reference to the drawings, and in particular to FIG. 1, it can be seen that an air duct cuff assembly is designated generally by the numeral 10. The assembly 10 is receivable and/or mounted to a port such as an air filter, an engine compartment, a throttle body or other similar structure. Although the air duct disclosed herein is used in automobile engine compartments, skilled artisans will appreciate that the duct and associated cuff assembly disclosed herein may be utilized in any environment where air or a gas needs to be transferred from one compartment to another and in such a way so as to seal the duct from external contaminants.

Generally, the air duct cuff assembly 10 comprises a tubular body 12. The tubular body may be straight, contoured, angled or provided with pleats so as to allow for flexibility of the body and in any desired length. It will further be appreciated that the body 12 does not need to be tubular, but can be any appropriately configured shape to facilitate manufacturing, although it is believed that a tubular configuration, which can be constructed by blow molding or injection molding, will be the most cost-effective construction. Connected or mounted to at least one end of the tubular body 12 is an internal cuff 14. Secured to and mounted around the internal cuff 14 and the tubular body 12 is an external cuff 18. Skilled artisans will appreciate that the tubular body may be provided where both ends provide both the internal cuff 14 and external cuff 18. As will become apparent as the detailed description proceeds, the air duct cuff assembly 10 provides certain advantages based upon the materials and structural configuration of the tubular body 12, the internal cuff 14, and the external cuff 18. Additionally, the air duct cuff assembly 10 is formed utilizing two separate overmolding processes. In the disclosed embodiment, the overmolding process is an injection-type molding process, but it will be appreciated that other molding processes could be employed. Moreover, other construction processes could be employed wherein the parts are separately formed and then secured to one another by other means. In any event, overmolding is chosen because it is believed to be the most robust way to attach a cuff to an end of an air duct. And also the most economical.

In forming the air duct cuff assembly, the first operation is accomplished by injecting and overmolding a soft seal cuff material onto a relatively harder tubular body material. Utilization of a softer elastomer material creates a melt bond providing a 100% leak-free seal. After further processing, a second overmolding operation is employed wherein both the internal cuff and the tubular body are overmolded utilizing a relatively harder polymeric material so as to form the external cuff 18. The external cuff overmold provides the strength needed to prevent the internal cuff from tearing under a shear load or bursting under high internal air pressures. The completed assembly may be secured to a port or duct by securing a worm gear clamp around the completed cuff to provide a maximum sealing force to prevent failure. In other words, a mechanical clamp may be secured around the harder external cuff material. The external cuff and internal cuff are constructed in such a way that application of a clamping force to the external cuff evenly distributes the clamping force to the internal cuff, which is mounted to and seals around an appropriately sized port.

Figure 2A:
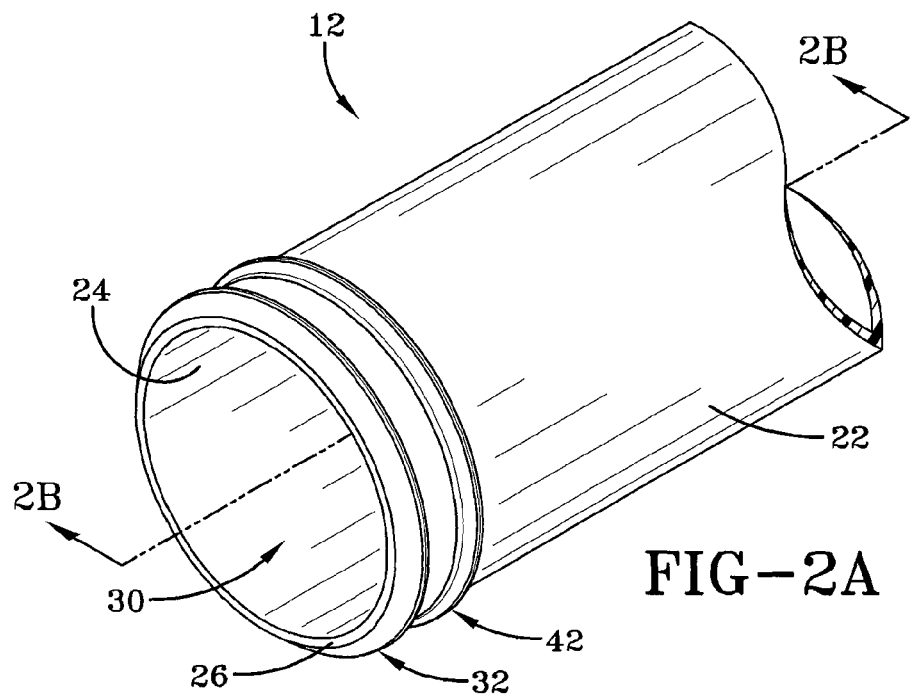
FIG. 2A is a perspective view of a tubular body utilized in the air duct cuff assembly according to the concepts of the present invention.
Figure 2B:
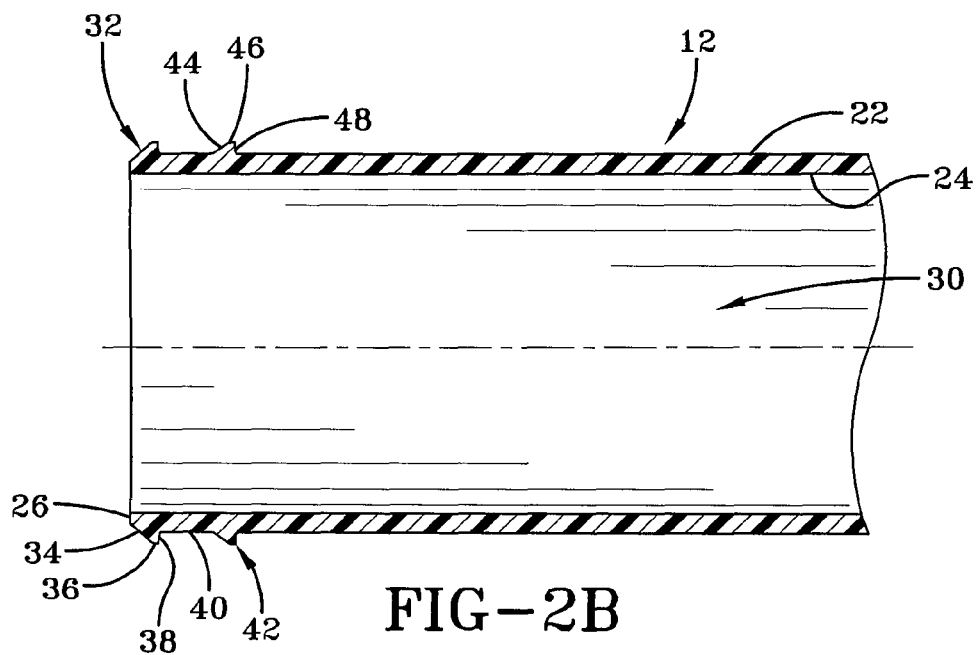
FIG. 2B is a cross-sectional view taken along lines 2B-2B of FIG. 2A showing the tubular body.

Referring now to FIGS. 2A and 2B, it can be seen that the tubular body 12 is provided, wherein only one end is shown. In any event, the tubular body 12 includes an exterior surface 22 opposite an interior surface 24. An end 26 connects the exterior and interior surfaces to one another. The tubular body 12 forms a body interior 30, which provides the opening or void to allow for transfer of air or other gaseous materials between ends of the tubular body. An end flange 32 may be disposed near the end 26. Although the end flange 32 is shown immediately adjacent to the end 26, skilled artisans will appreciate that the end flange 32 may be slightly displaced from the end 26.

The end flange 32 includes an angular ramp 34 that extends from the exterior surface 22 or the end 26. The angle of the angular ramp 34 may range anywhere from 5 degrees to 85 degrees, although it is believed that angles of 30 degrees to 55 degrees may be utilized in most embodiments. The angular ramp 34 terminates at an end flange exterior 36, which provides a relatively flat portion that is substantially parallel with the exterior surface 22. However, the end flange exterior 36 may be provided in a non-parallel configuration. An end flange step 38 extends from the exterior 36 to the exterior surface 22. The step 38 is likely substantially perpendicular with the exterior surface 22, but it may also be provided at some other angle.

Positioned away from the end flange 32 and the end 26 may be a cuff flange 42. The cuff flange 42 and the end flange 32 may be separated by a bridge surface 40, which, in most embodiments, has the same diameter as the exterior surface 22. However, the bridge surface 40 diameter may vary somewhat from the diameter of the exterior surface 22. In any event, the cuff flange 42 is configured in much the same manner as the end flange 32. The cuff flange 42 includes an angular ramp 44 extending from the bridge surface 40. The angular ramp 44 may have the same attributes as the angular ramp 34. Connected to and extending from the angular ramp 44 is a cuff flange exterior 46, which is substantially parallel, in most embodiments, to the exterior surface 22. However, a non-parallel arrangement of the cuff flange exterior 46 may be provided. Extending substantially perpendicularly from the cuff flange exterior 46 is a cuff flange step 48, which terminates at its opposite end with the exterior surface 22.

The tubular body 12, in most embodiments, is manufactured utilizing a blow-molding process. In some embodiments, the body may be configured by extrusion or injection molding. The tubular body may be made from a polymeric material such as polypropylene manufactured by Lyondell Bassel under port number Pro-Fax™ SV 152 which has a hardness value of 78 Shore D. Skilled artisans will appreciate that other polymeric materials having similar properties and values may also be utilized. Other suitable materials that could be used for the tubular body 12 are: nylon manufactured by BASF under the part number Ultrmid™

827G which has a hardness value of 121 Shore R; nylon 6/6 manufactured by DuPont under part number Zytel™ BM70G20HSLX which has a hardness value of 120 Shore R; or thermoplastic elastomer manufactured by Teknor Apex under part number Sarlink™ 4190B which has a hardness value of 90 Shore A. Accordingly, in some embodiments the material used for the tubular body 12 may have a hardness value ranging anywhere from about 70 Shore A to about 130 Shore R, and in other embodiments from about 90 Shore A to about 121 Shore R.

Figure 3A:
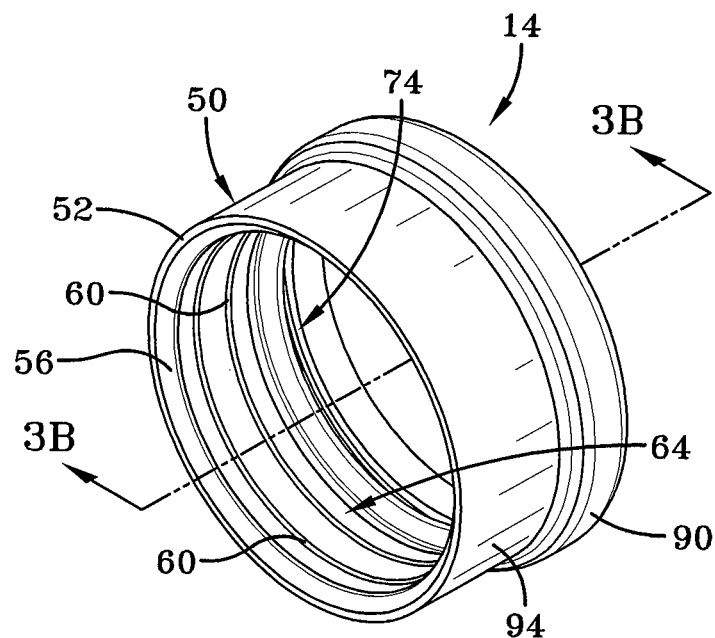
FIG. 3A is a perspective view of an internal cuff utilized with the air duct cuff assembly according to the concepts of the present invention.
Figure 3B:
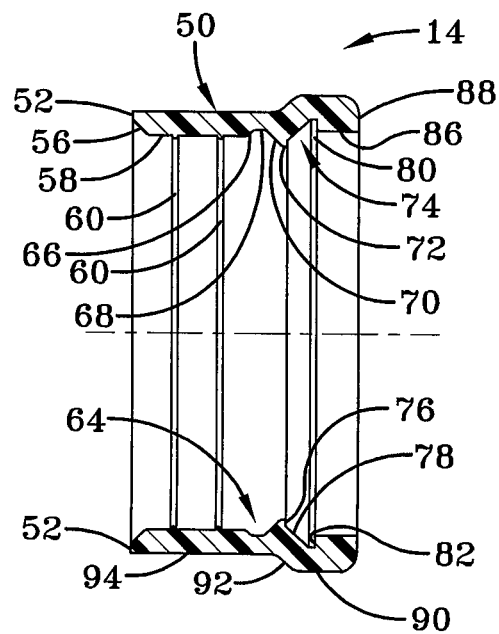
FIG. 3B is a cross-sectional view of the internal cuff taken along lines 3B-3B of FIG. 3A according to the concepts of the present invention.
Figure 4A:
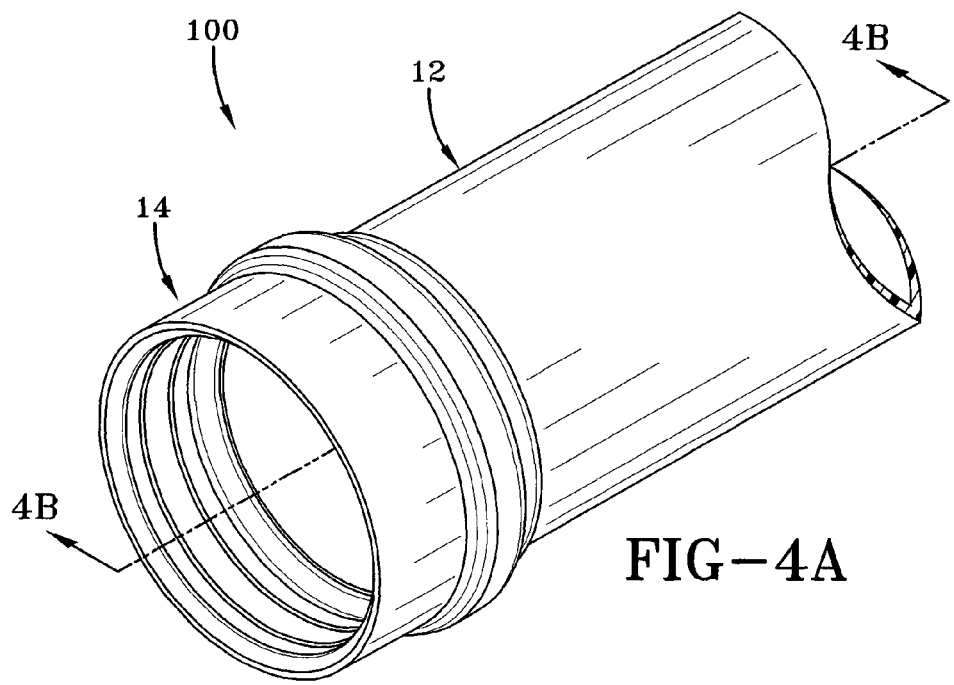
FIG. 4A is a perspective view of a sub-assembly showing the internal cuff connected to the tubular body according to the concepts of the present invention.
Figure 4B:
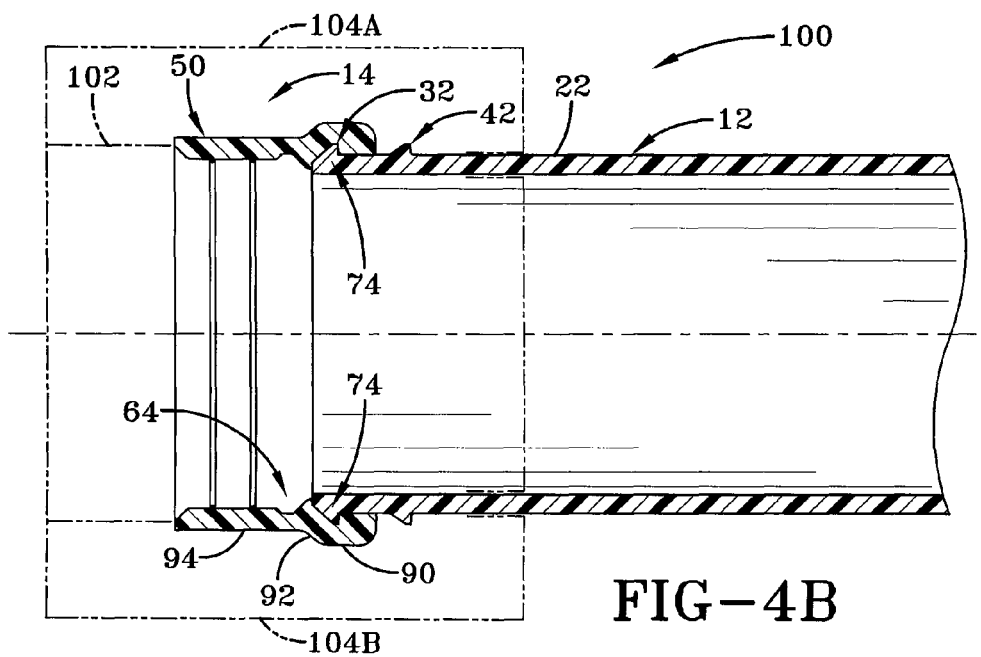
FIG. 4B is a cross-sectional view of the sub-assembly taken along lines 4B-4B of FIG. 4A and a schematic representation of an injection mold for forming the sub-assembly according to the concepts of the present invention.

Referring now to FIGS. 3A, 3B, 4A and 4B, it can be seen that the internal cuff 14 is molded, formed, assembled and/or otherwise secured to the tubular body 12. FIGS. 3A and 3B present the internal cuff by itself so as to allow for clear delineation of its structural features, while FIGS. 4A and 4B show the connection between the tubular body 12 and the internal cuff 14.

Specifically referring to FIGS. 3A and 3B, it can be seen that the internal cuff 14 includes an internal cuff body 50. The internal cuff body is constructed of a polymeric material and, in particular, a polymeric material which, in most embodiments, is relatively softer than the polymeric material utilized for the tubular body. In most embodiments, the internal cuff may be made from thermoplastic elastomer which is manufactured by RTP Company under part number RTP™ 6091-65 which has a hardness value of 65 Shore A. Other polymeric materials having similar properties and values may be utilized. Other suitable materials that could be used for the internal cuff are: thermoplastic elastomers manufactured by Exxon Mobile part number Satoprene™ 101-55, which has a hardness value of 55 Shore A, or Santoprene™ 101-64 which has a hardness value of 64 Shore A. Other suitable thermoplastic elastomers are manufactured by Teknor Apex under part numbers Sarlink 4175B, which has a hardness value of 75 Shore A, or Sarlink 4180B which has a hardness value of 80 Shore A. The RTP Company also manufactures thermoplastic elastomers RTP™ 6091-65, which has a hardness value of 65 Shore A, and RTP 6091-85, which has a hardness value of 85 Shore A. A liquid silicone rubber material manufactured by Wacker Chemical under part number LR 3070/60 which has a hardness value of 60 Shore A may also be utilized. Accordingly, in some embodiments, the material used for the internal cuff may have a hardness value ranging anywhere from about 45 Shore A to about 90 Shore A, and in other embodiments from about 55 Shore A to about 80 Shore A.

In the embodiment shown, the internal cuff body is formed by an injection-molding process over-molded to the tubular body 12. However, skilled artisans will appreciate that other manufacturing procedures could be utilized to secure the internal cuff to the tubular body. These other procedures may include, but are not limited to, mechanical or adhesive attachments, spin-welding or other heat securement processes. However, it is believed that the injection-molding process provides both cost and structural benefits over the other aforementioned processes.

The internal cuff body 50 includes a body end 52, which has an end chamfer 56 internally directed. In most embodiments the chamfer 56 may extend at about a 45-degree angle, although other angles may be employed. Skilled artisans will appreciate that the chamfer is employed so as to allow or facilitate mounting of the completed assembly 10 onto an appropriate port. In any event, the end chamfer 56 extends into an internal cuff interior 58. Radially extending inwardly from the interior 58 is at least one internal rib 60. As will become apparent, the internal rib or ribs 60 provide for a gripping force on the port onto which the completed assembly is mounted. Two internal ribs 60 are shown, but it will be appreciated that any number of internal ribs may be provided. The interior 58 may also provide for an internal extending lip 64. As such, the lip 64 extends from the interior 58 so that the lip 64 forms a larger inner diameter than the interior 58. The lip 64 may be provided to mount over a corresponding outward protuberance at an end of the port that is received in the completed assembly 10.

The internal lip 64 provides for a lip ramp 66 extending from the interior 58, which may be provided at any angle ranging from 5 degrees to 85 degrees, and in most embodiments will range between 35 degrees to 55 degrees. Extending from the lip ramp 66 is an internal ring 68, which may be substantially parallel with the outer exterior surface of the cuff body 50. Angularly extending from the internal ring 68 is a lip incline 70. The lip incline 70 may extend from the internal ring 68 at an angle ranging from zero to about 80 degrees. The lip incline 70 extends to an internal stop 72, which is substantially parallel with the cuff interior 58. As is evident from FIG. 3B, the diameter of the internal stop 72 is somewhat less than the diameter of the internal cuff interior 58.

Extending from the internal stop 72 is an end flange groove 74. As will become apparent as the description proceeds, the end flange groove 74 fits around and is secured to the end flange 32 of the tubular body 12. The end flange groove 74 includes a groove wall 76, which is substantially perpendicular to the internal stop 72. Angularly extending from the groove wall 76 is a groove flange 78 wherein the groove flange 78 may extend at any angle ranging between 5 degrees to 80 degrees with respect to the groove wall 76. Extending from the groove flange 78 is a groove flat 80, which is substantially parallel with the internal cuff's exterior surface. Extending substantially perpendicularly from the groove flat 80 is a groove step 82.

Extending further from the groove step 82 is an internal cuff collar 86. This surface may be substantially parallel with the internal stop 72 and the exterior of the cuff body 50. A collar end 88 extends substantially perpendicularly from the internal cuff collar 86 and is the end of the internal cuff opposite the body end 52. Extending from the collar end 88 is a collar exterior 90, which angularly transitions along a collar ramp 92 to an internal cuff exterior 94. The internal cuff exterior 94 is then connected to the body end 52.

Referring now to FIGS. 4A and 4B, it can be seen that a sub-assembly is designated generally by the numeral 100, wherein the sub-assembly includes the internal cuff 14 secured to the tubular body 12. The sub-assembly 100 is formed by insertion of an internal cuff mold mandrel 102 into the tubular body interior 30. The mold mandrel 102 extends to at least a portion of the tubular body beyond the cuff flange 42 that radially extends from the exterior surface of the tubular body. As skilled artisans will appreciate, the mold mandrel provides an underlying structure that is capable of supporting at least a substantial portion of the interior surfaces of the tubular body 12 and also allows for formation of the internal surfaces of the internal cuff 14. However, in some embodiments, the rigidity of the tubular body may be sufficient such that the mandrel 102 is not needed to extend into the tubular body to enable the molding operation that forms the cuff. A cuff mold 104A and 104B—which may be formed in halves or other number of parts—clamps around the mold mandrel 102 and the exterior surface 22 of the tubular body. Once a complete seal is formed between the mold 104, the mold mandrel 102 and the exterior surface of the tubular body, a polymeric material is injected into the mold 104A/B so as to form the internal cuff and resulting sub-assembly. Once the molding operation is complete and the polymeric material is cooled and allowed to sufficiently set, the mold 104 is opened and the mold mandrel 102 is withdrawn so as to provide the completed sub-assembly 100.

Referring now to FIGS. 5A and B, it can be seen that the external cuff 18 is designated generally by the numeral 118. As will become apparent as the description proceeds, the external cuff 18 is over molded on to the sub-assembly 100. The external cuff 18 is manufactured of a polymeric material having a hardness that is relatively harder than the material used for the internal cuff. In most embodiments, the external cuff is made from nylon 6 manufactured by BASF under part number Ultramid™ 8202 which has a hardness value of 100 Shore R. An alternative material is polypropylene manufactured by LyondellBassell under their part number Pro-Fax™ and SB891 which has a hardness value of 78 Shore D. Of course, other suitable materials may be utilized. Accordingly, in some embodiments, the material used for the external cuff may have a hardness value from about 60 Shore D to about 110 Shore R, and in other embodiments from about 78 Shore D to about 100 Shore R. In some embodiments, the external cuff material may be harder than the tubular body material. And in some embodiments the tubular body material may be harder than the external cuff material. Selection of the cuff materials and the tubular body material and their corresponding hardness values are dependent upon the particular end use of the completed assembly 10. And combination of materials in the above-identified ranges may be used.

The external cuff 18 is shown by itself in FIGS. 5A and 5B and such an individual component may be manufactured and then mechanically or adhesively secured to the sub-assembly 100. However, it is believed that, as with the formation of the internal cuff on the tubular body, the optimal method of manufacture is by injection molding as will be described in relation to FIG. 6. In any event, the external cuff 18 comprises an external cuff body 110. The external cuff body is formed with an external lip end 112, which radially extends from a neck 114. In most embodiments, the external lip end 112 extends substantially perpendicularly from the neck. Angularly extending from the neck 114, at an end opposite the lip end 112, is a shoulder 116 wherein the shoulder extends from the neck at an angle ranging anywhere from 10 degrees to 85 degrees, and in most embodiments will range from 35 degrees to 55 degrees. Extending from the shoulder 116 is a wall 120, which is substantially parallel with the neck 114. Extending inwardly radially from the wall 120 is a tapered end 122, which is opposite the external lip end 112. Skilled artisans will appreciate that the exterior surface of the external cuff body 110 includes the lip end 112, the neck 114, the shoulder 116, the wall 120, and the tapered end 122.

The internal surfaces of the external cuff body may be formed in the molding process so as to surround the external surfaces of the internal cuff and a portion of the exterior surface of the tubular body which encompasses at least the cuff flange 42.

Extending substantially perpendicularly from the tapered end 122 is an external cuff body internal surface 126. The surface 126 provides for a cuff flange groove 130 that fits around and is secured to the cuff flange 42 of the tubular body 12. The cuff flange groove 130 includes a groove flat 132 which is substantially perpendicular to the internal surface 126. Extending substantially perpendicularly from the groove flat 132 is a groove flange 134, which provides a surface that is substantially parallel with the internal surface 126. Angularly extending from the groove flange 134 is a groove step 136 that matches with the groove flange 78 of the internal cuff. The groove step 136 has a complementary angle of the groove flange 78 in relation to the internal surface 126. Extending from the groove step 136 is the internal surface 126 which extends to a collar rim 138, which also forms around the exterior surface of the internal cuff 14. Extending substantially perpendicularly from the collar rim 138 is a collar groove 140, which transitions to a collar shoulder 144 which transitions to a throat surface 146. The throat surface 146 terminates at the external lip end 112. As such, the external cuff body provides internal surfaces that are formed by the internal surface 126, the cuff flange groove 130, the collar rim 138, the collar groove 140, the collar shoulder 144, and the throat 146. In the embodiment shown, all of these internal surfaces are formed in the molding process that forms the external cuff 18. Moreover, these internal surfaces are formed by the external surfaces of the internal cuff and the exterior surface of the tubular body.

The external cuff 14 also provides exterior structural features that may be utilized in the completed assembly. In particular, a plurality of external tabs 150 may extend from the shoulder 116 and neck 114 at angular increments about the external cuff. These tabs 150 may be utilized to provide for reinforcement of the external cuff and may also be utilized to position and retain components of a clamping device, which is not shown.

The external cuff 14 also provides for at least one end notch 154. The end notch 154 extends from the external lip end 112 toward the shoulder 116. In the embodiment shown, the end notch 154 terminates at a notch apex 156 wherein notch sides 160A and 160B extend from the apex toward the end lip. This angular notch allows for the external cuff material to be somewhat radially deflected. In other words, when a band clamp or other clamping device is secured around the outer periphery of the external cuff, and in particular the neck 114, a radial compressive force is applied from the relatively rigid external cuff to the relatively soft internal cuff and correspondingly toward the port that receives the air duct cuff assembly 10. The number of notches selected depends upon the combination of materials selected for the external and internal cuffs so as to insure that a sufficient clamping force can be exerted on the cuffs without adversely affecting any of the bonds between the cuffs and the tubular body. Moreover, it will be appreciated that the thickness of external cuff may vary in thickness depending on the chosen hardness in view of the desire to allow the external cuff to flex slightly to permit installation of the completed assembly 100 on to the mating duct or tube. It will further be appreciated that in addition to the configuration of the notches 154 and the thickness of the external cuff at the neck 114, the shoulder 116, the wall 120 and the tapered end 122, and the hardness properties of the material used, that flexibility of the external cuff can be adjusted by the dimensional and physical properties of the internal cuff and the positioning of the internal surface 126 with respect to the end 26 of the tubular body 12.

Figure 6:
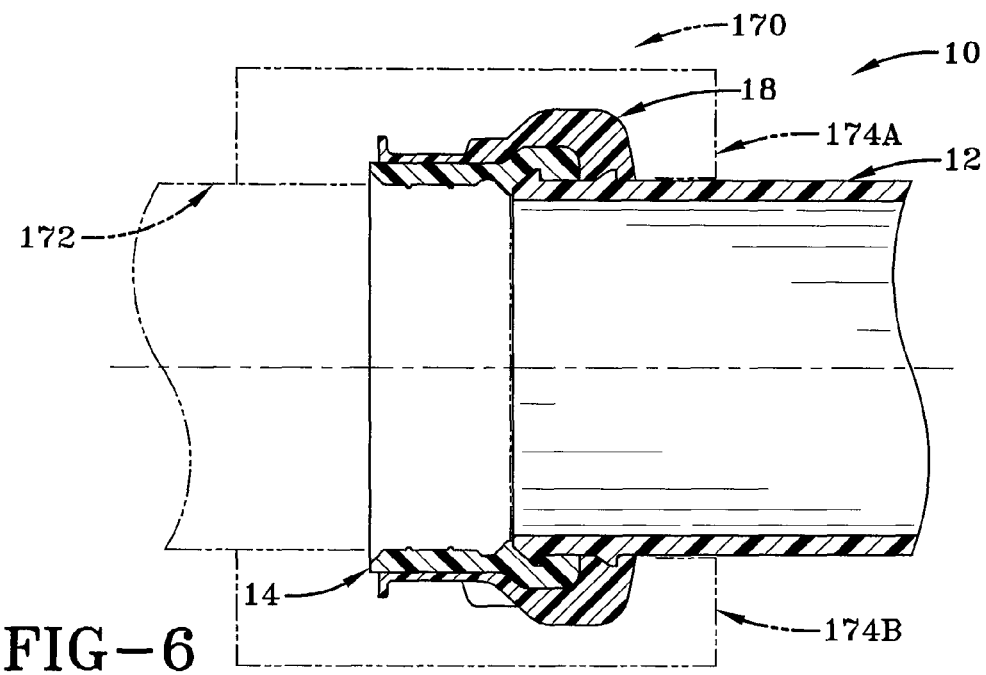
FIG. 6 is a cross-sectional view of the completed air duct cuff assembly as formed in another schematic representation of an injection mold in accordance with the concepts of the present invention.

Referring now to FIG. 6, it can be seen that the air duct cuff assembly 10 is formed by a final assembly mold 170. A mold includes a mandrel 172 that may at least support a portion of the internal cuff 14 and in some embodiments may also support some of the interior surfaces of the tubular body. At a minimum, the mandrel 172 provides for a sealing surface for the mold halves 174A and 174B, which seal around the mandrel and also the external surface of the tubular body 12. The mold halves 174A and 174B are positioned so as to exert a sealing surface around the internal cuff 141 and the tubular body 12. Once the mold is closed and sealed, a polymeric material is injected into the mold cavity which forms the external cuff 18. After the polymeric material has cooled and set, the mold 174 A/B is opened, and the mandrel 172 withdrawn and any other appropriate finishing steps are completed.

Figure 8:
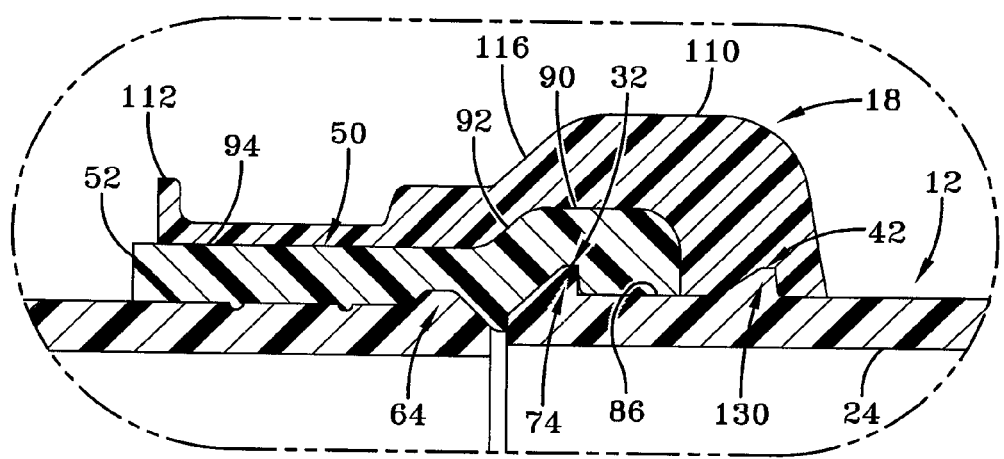
FIG. 8 is an enlarged cross-sectional view of a portion of the air duct cuff assembly mounted to the port in accordance with the concepts of the present invention.

As best seen in FIG. 8, the external cuff conforms to the exterior surface of the tubular body about the cuff flange 42 and also around a substantial portion of the internal cuff around the collar exterior 90. Due to the flexing of the neck 114 because of the notches 154, there is minimal bonding, if any, between the neck 114 and the underlying internal cuff exterior 94.

Figure 7:
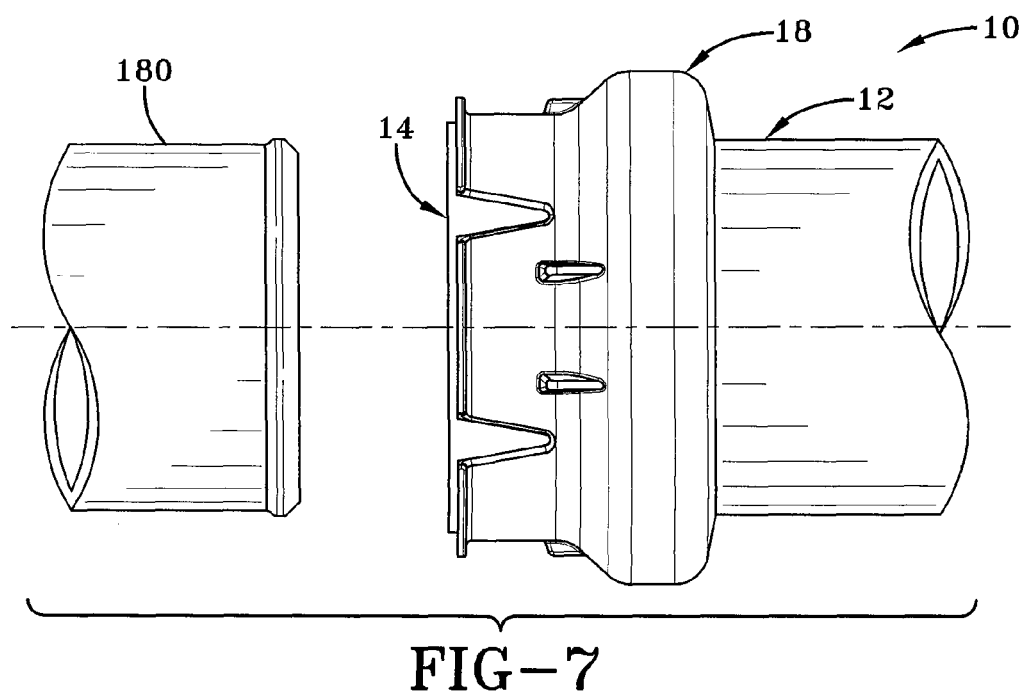
FIG. 7 is an exploded view showing the air duct cuff assembly and a port to which the cuff assembly is connected or mounted.

Once the assembly is completed as shown in FIGS. 7 and 8, the assembly 10 is fitted upon a port 180 and an appropriate clamping device may be secured around the cuff assembly so as to secure it to the exterior surface of the port.

Based on the foregoing, the advantages of the present construction are readily apparent. The air duct cuff assembly 10 provides for a secure connection to a port, and more importantly a connection that can withstand significant shear loads and maintain a desired seal even when high internal air pressures are exerted within the tubular body 12. The cuff assembly 10 resists tearing, provides a permanent leak-free seal, does not flex in an unwanted manner, and can be made at a significantly lower cost than other types of air duct assemblies. The construction is further advantageous by the utilization of different hardness of polymer materials for the tubular body and, in particular, the internal cuff and the external cuff. Utilization of a relatively soft polymeric material for the internal cuff allows for compressive forces to be applied so as to maintain a desired seal. Utilization of a relatively harder material for the external cuff allows for that material to withstand the clamping forces without initiating a tear, which would likely occur when the clamping forces are directly applied to the softer internal cuff polymeric material. In other words, the external harder material is able to withstand the applied forces exerted by a band clamp or the like, and those forces are uniformly and evenly distributed about the relatively softer internal cuff material so as to provide a desired seal around a port or other similar duct device that is inserted into the assembly 10.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A detachable air duct system for transferring air or the like from one component to another, the system comprising:
   a port;
   a tubular body having an exterior surface, an interior surface and an end which connects said exterior surface to said interior surface, said end having a diameter no larger than said exterior surface, said interior surface forming a body interior which allows for the transfer of air;
   an internal cuff connected and bonded to said exterior surface and extending axially from said end of said tubular body; and
   an external cuff secured and mounted to said internal cuff and said exterior surface, said external cuff extending axially and radially from said internal cuff and said exterior surface, wherein said external cuff is made from a material relatively harder than a material used for said internal cuff, and wherein said port is received in said internal cuff, and said internal cuff and said external cuff are detachably secured to said port,
   wherein said internal cuff has an internal cuff exterior and said external cuff is secured and mounted to said exterior surface of said tubular body and to said internal cuff exterior of said internal cuff,
   wherein said exterior surface has an end flange extending outwardly radially therefrom proximal said end,
   wherein said internal cuff is disposed around and bonded to said end flange, and wherein said exterior surface has a cuff flange extending radially therefrom and positioned away from said end, said external cuff secured and mounted to said cuff flange.

2. The duct system according to claim 1, wherein internal cuff has a hardness value of between about 45 Shore A to about 90 Shore A.

3. The duct system according to claim 1, wherein said external cuff has a lip end secured and mounted to said internal cuff and a tapered end secured and mounted to said exterior surface, said lip end having at least one axial notch extending toward said tapered end so as to allow said external cuff to be radially deflected.

4. The duct system according to claim 3, wherein said at least one axial notch is formed by a pair of notch sides that extend from said lip end and converge at a notch apex.

5. The duct system according to claim 1, wherein said external cuff has a lip end secured and mounted to said internal cuff, said external cuff having at least one axial notch extending from said lip end to allow said external cuff to be radially deflected.

6. The duct system according to claim 1, wherein said internal cuff extends axially from said end without contacting said interior surface.

7. The duct system according to claim 1, wherein said internal cuff has an internal cuff interior with an inner diameter greater than a diameter of said tubular body's interior surface.

8. The duct system according to claim 7, wherein said internal cuff has an inwardly extending internal stop that is adjacent a groove wall that abuts said end of said tubular body.

9. The duct system according to claim 1, wherein said internal cuff extends axially away from said end at least as far as said external cuff.

* * * * *